(12) United States Patent
Lin

(10) Patent No.: US 7,123,877 B2
(45) Date of Patent: Oct. 17, 2006

(54) BASEBAND CONTROLLER IN A WIRELESS LOCAL AREA NETWORK

(75) Inventor: John Lin, Downey, CA (US)

(73) Assignee: Broadcom Corporation, Irvine, CA (US)

( * ) Notice: Subject to any disclaimer, the term of this patent is extended or adjusted under 35 U.S.C. 154(b) by 812 days.

(21) Appl. No.: 10/007,435

(22) Filed: Nov. 8, 2001

(65) Prior Publication Data

US 2003/0096634 A1     May 22, 2003

(51) Int. Cl.
*H04B 7/00*     (2006.01)
*H04Q 7/20*     (2006.01)

(52) U.S. Cl. ............. 455/41.2; 455/507; 455/514; 455/517

(58) Field of Classification Search ............... 455/41.2, 455/514, 185.1, 507, 517, 181.1
See application file for complete search history.

(56) References Cited

U.S. PATENT DOCUMENTS

| | | | |
|---|---|---|---|
| 5,131,015 A * | 7/1992 | Benjaram et al. ............ | 375/377 |
| 6,373,791 B1 * | 4/2002 | Ukita et al. .................. | 369/6 |
| 6,731,939 B1 * | 5/2004 | Watanabe et al. ............ | 455/450 |
| 6,839,325 B1 * | 1/2005 | Schmidl et al. ............. | 370/242 |
| 2002/0151275 A1 * | 10/2002 | Trost et al. ................... | 455/41 |
| 2003/0096576 A1 * | 5/2003 | Salonidis et al. ............. | 455/41 |

* cited by examiner

*Primary Examiner*—Matthew D. Anderson
*Assistant Examiner*—Eugene Yun
(74) *Attorney, Agent, or Firm*—Garlick Harrison & Markison; Kevin L. Smith; James A. Harrison

(57) ABSTRACT

A baseband controller includes a microsequencer that is formed to include special hardware resources and a configuration that facilitates using the micro-sequencer as a real-time baseband controller. The microsequencer includes a 72-bit correlator that way also be used as an accumulator. The correlator is able to communicate with a 72-bit arithmetic logic unit, enabling the correlator to act as an accumulator, as well as a plurality of clocks and timers that facilitate the timing functionality to satisfy Bluetooth specifications. More specifically, the microsequencer includes at least four clocks and eight times. The four clocks include an externally driven Bluetooth clock, an externally driven real-time clock, a native Bluetooth clock and a native real-time clock. The microsequencer further includes at least four registers for temporarily storing computational data. The storage registers have different sizes for storing different sized packets of computational data.

15 Claims, 4 Drawing Sheets

BASEBAND CONTROLLER IN A WIRELESS LOCAL AREA NETWORK

BACKGROUND

1. Technical Field

The present invention relates to wireless communication systems and, more specifically, micro-controllers used in wireless communication systems.

2. Related Art

The Bluetooth wireless technology allows users to make effortless, wireless and instant connections between various communication devices such as notebook computers, desktop computers and mobile phones. Because Bluetooth systems use radio frequency transmissions to transfer both voice and data, the transmissions occur in real-time. The Bluetooth specification provides for a sophisticated transmission mode that ensures protection from interference and provides security of the communication signals.

According to most designs that implement the Bluetooth specifications, the Bluetooth radio is being built into a small microchip and is designed to operate in frequency bands that are globally available. This ensures communication compatibility on a worldwide basis. Additionally, the Bluetooth specification defines two power levels. A first power level covers the shorter, personal area within a room and a second power level is designed for covering a medium range. For example, the second power level might be used to cover communications from one end of a building, such as a house, to the other. Software controls and identity coding are built into each microchip to ensure that only those units preset by the owners can communicate with each other.

More specifically, the Bluetooth wireless technology supports point-to-point and point-to-multipoint connections. Under the Bluetooth specifications, one master can communicate with up to seven slave devices. At any one instant, a Bluetooth master can communicate or transmit over three channels to the slaves under current specifications and designs. Additionally, one group of Bluetooth devices, namely a master and a plurality of slaves, may also communicate with another group to create communication networks of continually configurable and flexible configurations. The topology is best described as a flexible and extendible micronetwork.

The Bluetooth specification is made to facilitate compatibility among systems made by different vendors and sold and utilized throughout the world. At the same time, the Bluetooth protocols and specifications are open to enable the use of proprietary processes underneath the defined communication protocols. The Bluetooth protocol stack can be divided into four layers, notwithstanding that it allows for proprietary implementation, according to the purposes and aspects of the protocol. For example, the core Bluetooth protocol defines the protocols for baseband operation, as well as the link manager protocol (LMP), logical link and control adaptation protocol (L2CAP) and service discovery protocol (SDP).

The second protocol layer is the cable replacement protocol that includes the serial cable emulation protocol (RSCOMM). The third protocol layer is the telephony control protocols which includes the telephony control specification (TCS binary) and the AT commands. Finally, the fourth protocol layer includes the adopted protocols, such as point-to-point protocol (PPP), transport control protocol/user datagram protocol (TCP/UDP), object exchange protocol (OEP), wireless application protocol (WAP), WAP application environment (WAE) and others. In addition to the above mentioned protocol layers, the Bluetooth specification also defines a host controller interface (HCI). HCI provides a command interface to the baseband controller, link manager, as well as access to hardware status and control registers.

The Bluetooth core protocols include Bluetooth-specific protocols that have been developed for Bluetooth systems. For example, the RFCOMM and TCS binary protocol have also been developed for Bluetooth but they are based on the ETSI TS 07.10 and the ITU-T recommendations Q.931 standards, respectively. Most Bluetooth devices require the Bluetooth core protocols, in addition to the Bluetooth radio, while the remaining protocols are only implemented when necessary. The cable replacement layer, the telephone control layer and the adopted protocol layer form application-oriented protocols that enable applications to run on top of or over the Bluetooth core protocols. Because the Bluetooth specification is open, these additional protocols may be accommodated in an inoperable fashion that is not necessarily required.

The baseband and link control layers facilitate the physical operation of the Bluetooth transceiver and, more specifically, the physical RF link between Bluetooth units forming a network. As the Bluetooth standards provide for frequency-hopping in a spread spectrum environment in which packets are transmitted in continuously changing defined time slots on defined frequencies, the basesband and link control layer utilizes inquiry and paging procedures to synchronize the transmission of communication signals at the specified frequency and clock cycles between the various Bluetooth devices.

The Bluetooth core protocols further provide two different types of physical links with corresponding baseband packets. A synchronous connection-oriented (SCO) and an asynchronous connectionless (ACL) physical link may be implemented in a multiplexed manner on the same RF link. ACL packets are used for data only while the SCO packets may contain audio, as well as a combination of audio and data. All audio and data packets can be provided with different levels of error correction and may also be encrypted if required. Special data types, including those for link management and control messages, are transmitted on a special specified channel.

The Bluetooth protocols are intended for rapidly developing applications using Bluetooth technology. These applications include an ultimate headset, three-in-one phone, local network access, file transfer and Internet bridge. Because of the different types of applications that are envisioned for Bluetooth systems, several aspects of the communication protocols are very important. One requirement for a Bluetooth device is to be able to communicate and transfer its signals in a real-time basis. Another requirement that is extremely important for a Bluetooth system is that it be able to transmit and receive and interpret transmissions at exact moments in time. In the context of a Bluetooth network that includes one master and seven slaves, the synchronization and timing requirements for the communications can be significant for any one device. Current micro-sequencers and controllers, for example, do not have the capability to communicate with up to seven slaves on a real-time basis because it is impossible for any one micro-controller to satisfy the real-time Bluetooth requirements. For example, the internal data pipelines and supporting hardware to facilitate such communications do not readily support this requirement that is found in the Bluetooth specification. Stated differently, the data pipeline designs of masters and micro-controllers cannot readily process all of the data for seven slaves on a real-time basis. Accordingly, what is needed is a device that provides the ability for a master to communicate with up to seven other devices concurrently and on a real-time basis while satisfying Bluetooth timing requirements.

SUMMARY OF THE INVENTION

A micro-sequencer is formed to include special hardware resources and a configuration that facilitates using the micro-sequencer as a real-time Bluetooth baseband controller. Because a master in a Bluetooth network may communicate with up to seven slaves, and further because the Bluetooth requirements are very timing oriented, the ability of a system to satisfy the Bluetooth requirements for each of the seven slaves is very difficult. The inventive micro-sequencer includes a 72-bit correlator that may also be used as an accumulator, wherein the topology includes the correlator being able to communicate with a 72-bit arithmetic logic unit which, therefore, enables the correlator to act as an accumulator, as well as a plurality of clocks and timers that facilitate the timing functionality that is required to satisfy Bluetooth specifications. More specifically, the micro-sequencer includes at least four clocks and eight timers in one embodiment of the present invention. The four clocks include an externally driven Bluetooth clock, an externally driven real-time clock, a native Bluetooth clock and a native real-time clock. The native Bluetooth clock has a period that is equal to 312.5 periods of the native real-time clock. The externally driven Bluetooth clock has a period that matches that of the native Bluetooth clock. Whether the externally driven real-time clock has a period that matches that of the native real-time clock, of course, depends upon the external clock source that is used to drive the externally driven real-time and Bluetooth clocks.

The micro-sequencer of the described embodiment further includes at least four registers for temporarily storing computational data. The storage registers are made to have different sizes for storing different sized packets of computational data. In the described embodiment of the invention, the temporary storage registers include a 64-bit storage register, a 48-bit storage register, a 32-bit storage register and a 16-bit storage register. Additionally, a data storage logic block is coupled to determine the size of a received computational data packet that is to be temporarily stored and to determine which of the storage registers should be used to store the computational data. The data storage logic block produces control signals to a demultiplexer to direct the routing of the data packet to the appropriate storage register.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
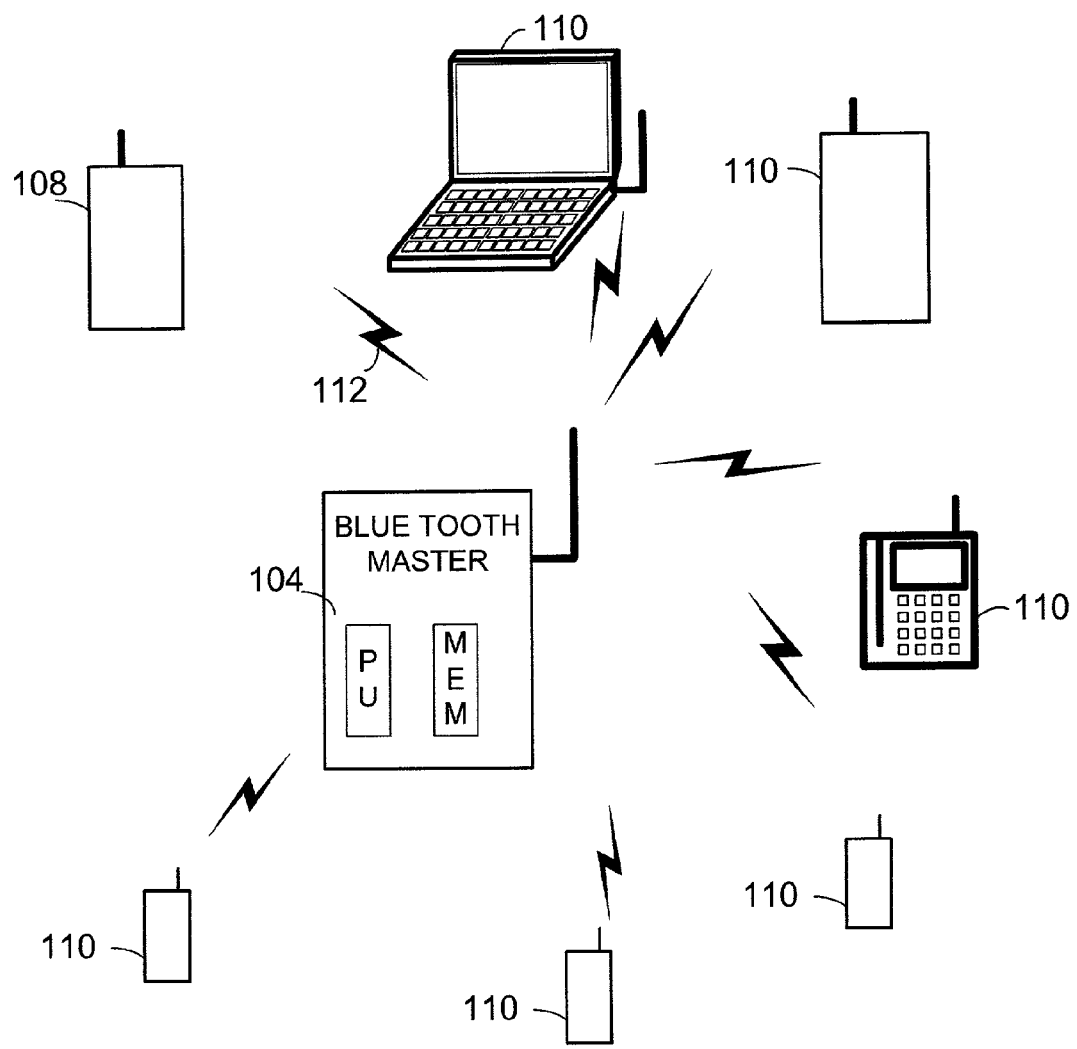
FIG. 1 is a functional block diagram of a Bluetooth micro network formed according to one embodiment of the present invention.

FIG. 1 is a functional block diagram of a Bluetooth micro network formed according to one embodiment of the present invention. As may be seen, a Bluetooth master 104 communicates with a plurality of slaves 108 and 110. More specifically, master 104 communicates with slave 108 over communication link 112. Each of the previously mentioned communication layer exchanges may occur between master 104 and the slaves 108 and 110 at any time. Additionally, any one of the slave devices, such as slave 108, may execute each of the aforementioned applications. For example, one slave might be an interface to a wireless modem, while another might be an interface to a broadband modem to wirelessly link a user device by way of the Bluetooth master 104 and slaves 108 and 110, thereto.

Others of the slave devices 110 shown here in FIG. 1 might comprise communication devices that operate with user devices of a completely different type. For example, at least some of the slaves shown in FIG. 1 might be high performance speakers. In this example, the Bluetooth system would be used to deliver audio for playback by the speakers. Thus, as may be seen, one Bluetooth network is able to not only transmit audio signals for speakers to play for entertainment purposes, but also to transmit data signals to a specified communication device to enable the user to "surf" the web while listening to his/her favorite music.

Figure 2:
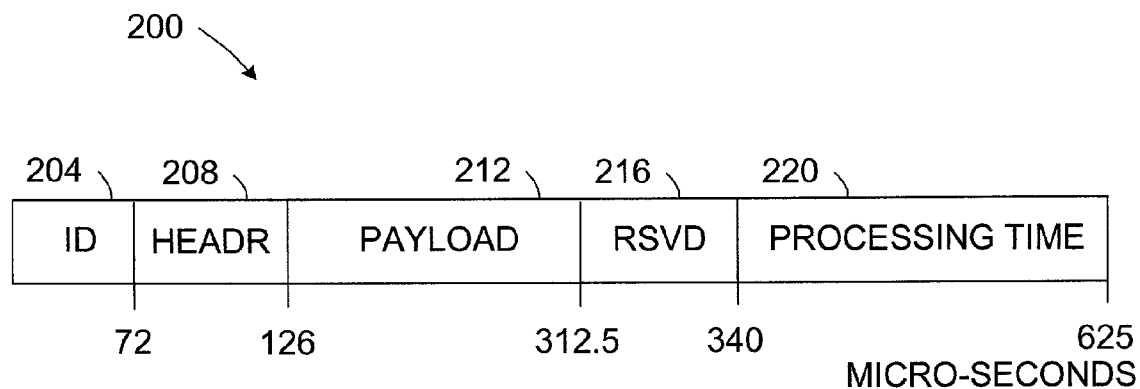
FIG. 2 illustrates a "transmit and receive" cycle for a Bluetooth transmission.

FIG. 2 illustrates a "transmit and receive" cycle for a Bluetooth transmission. Referring now to FIG. 2, signal 200 illustrates a typical Bluetooth signal layout. This signal layout applies to transmitted signals as well as received signals. Signal 200 includes an ID portion 204, a packet header portion 208, a payload portion 212, a reserved buffer portion 216 and an processing portion 220. As may be seen, two Bluetooth clock cycles totaling 625 microseconds are shown. Initially, the first 72 microseconds are allocated for transmitting ID portion 204. The subsequent 54 microseconds are then allocated for transmitting packet header information Thereafter, the remaining time for the first Bluetooth clock cycle is for transmitting data, control commands, status commands, etc., in payload portion 212.

The second Bluetooth clock cycle includes reserved portion 216. Reserved portion 216 is, effectively, a buffer portion to allow for task or communication completion. For example, it is for received skewed signals that are being received late. Thus, a Bluetooth system may receive data in this portion but only because of operational variations that result from unplanned delays or skewing. In the descried embodiment, the reserved portion 216 is approximately 27.5 microseconds long. Once the reserved period 216 is expired, processing portion 220 is for allowing the Bluetooth device time to process data or prepare for a subsequent transmission/reception. Thereafter, the Bluetooth device is in a listening mode to receive transmissions from another Bluetooth device.

Figure 3:
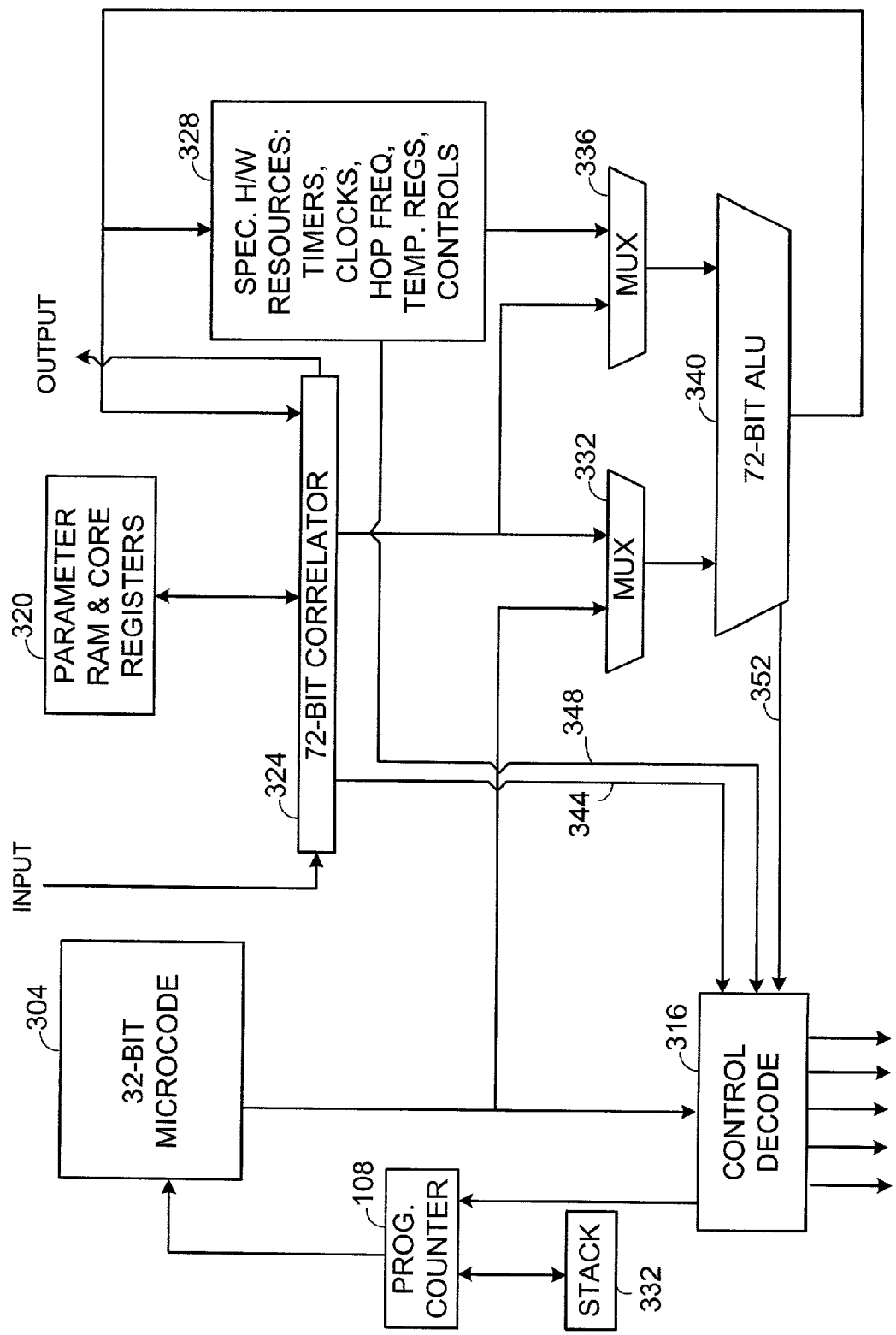
FIG. 3 is a functional block diagram of a microsequencer formed according to one embodiment of the present invention.

FIG. 3 is a functional block diagram of a microsequencer formed according to one embodiment of the present invention. A microsequencer 300 includes a 32-bit microcode read-only memory 304 that is for storing microcode (computer instructions that define the operational logic of the microsequencer of FIG. 3). Microcode read-only memory 304 further is coupled to receive control signals from a program counter (PC) 308 that further communicates with a stack 312. The control commands from PC 308 select what instruction(s) is(are) sent to a control decode module 316. Control decode module 316 is coupled to receive computer instructions produced by microcode read-only memory 304 and to execute the received instructions in accordance with the logic defined within microcode memory 304. Control decode module 316 further generates control commands to PC 308 to prompt it to change its program counter value (and therefore what instructions are sent from microcode ROM 304 to control decode module 316).

A random access memory and core registers module 320 is coupled to communicate with a 72-bit correlator 324. 72-bit correlator 324 further is coupled to receive input data from an external source and to produce output data to an external source. 72-bit correlator 324 further is coupled to communicate over line 326 with multiplexers 332 and 336. The multiplexers 332 and 336 further communicate with a 72-bit arithmetic logic unit 340. In addition to the above circuitry, microsequencer 300 includes hardware modules to provide Bluetooth specific resources to facilitate real-time communications with up to seven slaves as is required by the Bluetooth specification. The special hardware resources are collectively shown as special hardware resources 328 in FIG. 3. As may also be seen, 72-bit correlator 324, as well as 72-bit arithmetic logic unit 340 and special hardware resources 328, each transmit condition signals 344, 352 and 348, respectively, to control decode module 316 that reflect status and operational conditions.

One aspect of the microsequencer 300 is that it includes a 72-bit correlator 324 that may be used as an accumulator. Moreover, the data within 72-bit correlator 324 may also be transmitted to 72-bit arithmetic logic unit 340 by way of multiplexers 332 and 336. Accordingly, a value received within the 72-bit correlator 324 may be transmitted to 72-bit arithmetic logic unit 340 for processing in a given computation. The coupling of 72-bit correlator 324 to 72-bit arithmetic logic unit 340 is new. Moreover, such coupling by way of demultiplexers 332 and 336 also is new. Finally, as may be seen, 72-bit correlator 324 and special hardware resources circuitry 328 are coupled to produce condition signals, namely, status signals, flags and interrupts to control decode module 316 by way of condition signals 344 and 348, respectively.

Figure 4:
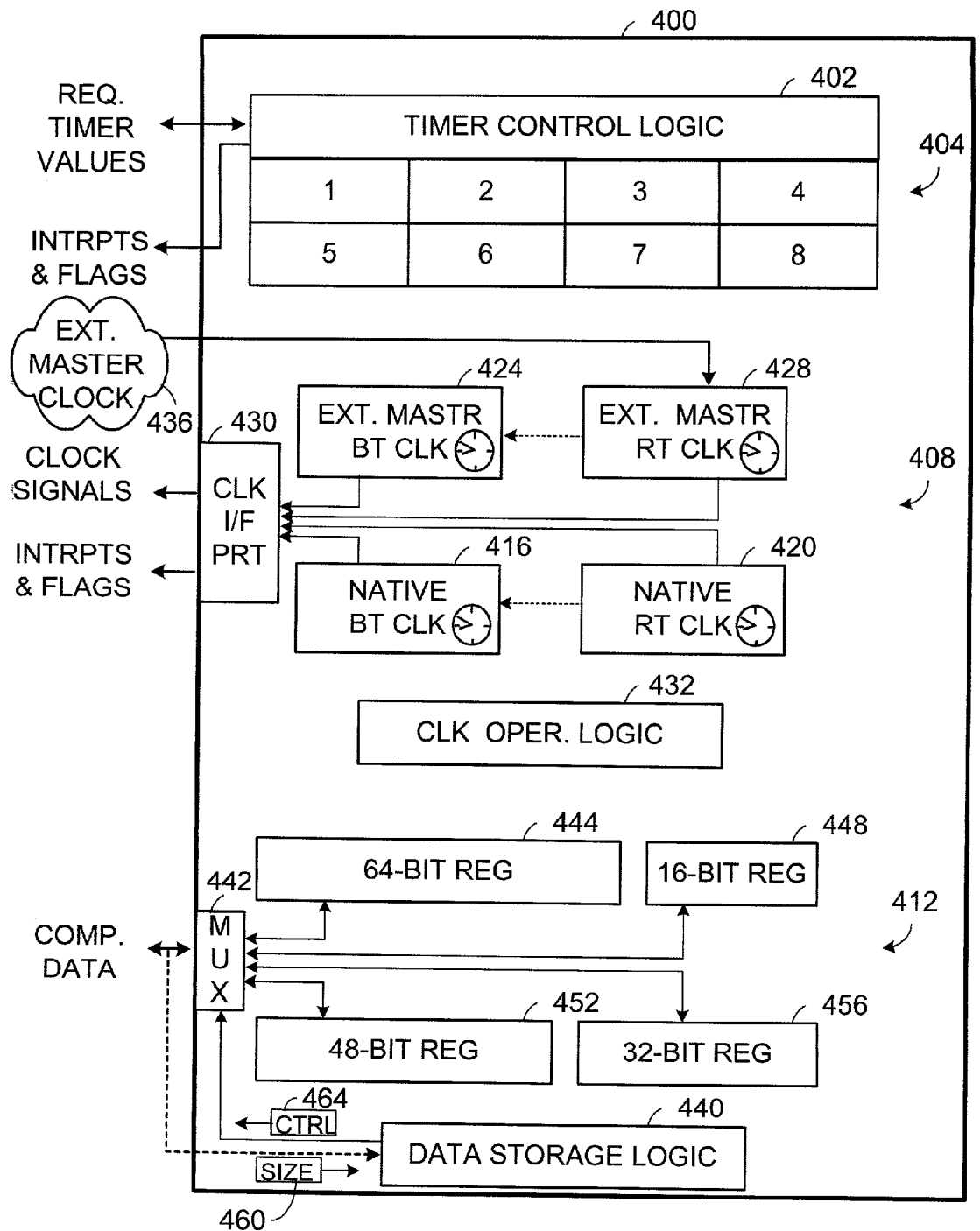
FIG. 4 is a functional block diagram of one embodiment of special hardware resources circuitry.

FIG. 4 is a functional block diagram of one embodiment of special hardware resources circuitry 328, as shown in FIG. 3. Referring now to FIG. 4, three areas are shown generally at 404, 408 and 412 that illustrate some of the circuitry that has been included into a microsequencer that operates as a Bluetooth baseband controller. The circuitry portion shown generally at 404 includes a plurality of timers and their corresponding timer control logic 402. The special hardware resources circuitry 400, which represents one embodiment of the special hardware resources circuitry 328 of FIG. 3, includes eight timers and their corresponding timer control logic 402 in circuitry portion 404. As will be explained in greater detail below, the special hardware resources circuitry 400 comprises four clocks in the described embodiment. The timers of circuitry portion 404 operate to count an elapsed amount of time and are driven by one of the four clocks found within special hardware resources circuitry 400. In general, the timer control logic 402 operates to receive a requested timer counting value from a device needing to know when a specified amount of time has elapsed and to assign that requested count value to one of the eight timers. Thereafter, when the elapsed amount of time has expired, the assigned timer generates an interrupt, sets a flag, or performs other known types of indications or alerts to advise the requesting device that the specified amount of time has elapsed. One reason that special hardware resources circuitry 400 includes eight timers is to satisfy the potential number of timing requests that could occur at any given time in a system that is operating according to Bluetooth specifications.

A second portion of circuitry shown generally at 408 of the special hardware resources circuitry 400 includes a plurality of clocks and clock operational logic. More specifically, the four clocks include a native Bluetooth clock 416, a native real-time clock 420, an externally driven Bluetooth clock 424, an externally driven real-time clock 428 and a clock port 430. Additionally, the circuitry shown generally at 408 includes a clock operational logic block 432 that controls the operation of the clocks and prompts each of the four clocks 416 through 428 to generate clock signals and interrupts as required to external devices.

According to one aspect of the present invention, a microsequencer for processing Bluetooth communications is formed to have an internal clock frequency that is equal to 12 MHz. Stated differently, one real-time clock pulse is $\frac{1}{2}^{th}$ microseconds long. According to the Bluetooth specifications, one Bluetooth clock cycle is equal to 312.5 microseconds. Exactly two Bluetooth clock cycles, therefore, are equal to 625 microseconds. Here, therefore, 3750 real-time clock pulses are equal to the period of one Bluetooth cycle.

Accordingly, as may be seen, the native real-time clock 420 produces real-time clock signals to the native Bluetooth clock 416. Similarly, the externally driven real-time clock 428 produces clock signals to externally driven Bluetooth clock 424. Each of the four clocks is operable to produce clock signals or interrupts to external devices as directed by clock operational logic block 432. Each of the clocks is coupled to produce a clock output from clock port 430.

In order to satisfy Bluetooth requirements, the possibility exists that more than one real-time or Bluetooth clock is required. Because the inventor herein has realized that it is advantageous to create separate and independent clocks to maintain flexibility, among other benefits, a second set of clocks, namely the externally driven real-time clock 428 and the externally driven Bluetooth clock 424 are included. Each of these two clocks, however, is driven by a received clock signal from an external clock source 436 (for example, from an external master while the device in which circuitry 400 is installed is operating as a slave). As is known by those skilled in the art, when a device acts a slave, the timing of operations are determined by an external master. Accordingly, the present invention facilitates receiving clock signals from an external master for synchronizing the externally driven real time clock 428 to clock signals received from the external master. The synchronized and externally driven real time clock 428 then drives a Bluetooth clock 424 to cause it to be synchronized with the external master's Bluetooth clock.

The clock operational logic module 432 serves to monitor when an interrupt or time value or flag should be generated by each of the two Bluetooth clocks 416 and 424, as well as each of the two real-time clocks 420 and 428. As may be seen, the special hardware resources circuitry 400, by including four clocks and eight timers in circuit portions 404 and 408 is able to provide significant timing and control capability to satisfy Bluetooth operational requirements.

A third portion of special hardware resources circuitry 400 is the circuitry shown generally at 412. As may be seen, the circuitry shown generally at 412 includes four registers for storing computational data and a data storage logic module. More specifically, a multiplexer 442 is coupled to each of the four registers 444, 448, 452 and 456 to distribute computational data for temporary storage according to control commands received from a data storage logic module 440. Thus, the multiplexer 442 is coupled to produce computational data to a 64-bit storage register 444, a 16-bit storage register 448, a 32-bit storage register 456 and a 48-bit storage register 452. The multiplexer 442 also communicates with at least one external device that has computational data that is to be stored on a temporary basis.

Data storage logic module 440 monitors the size of data that is to be temporarily stored. In the functional block diagram of FIG. 4, a signal 460 is conducted to data storage logic module 440 indicating the size of the data that is to be temporarily stored. Accordingly, data storage logic module 440 generates a control signal 464 that is produced to demultiplexer 442 to direct it to route the data packet to one of the four storage registers 444 through 456.

Because FIG. 4 is functional in nature, the described operation is functional in nature and generally represents the logical operation of the inventive system. In one embodiment of the invention, the microsequencer of FIG. 3 implements the functional aspects described with respect to the system of FIG. 4. For example, microcode ROM 304 of FIG. 3 defines computer instructions that direct control decode module 316 to generate control commands to cause a data computational value to be stored in any one of the special hardware registers of special hardware resources block 328. In one embodiment of the invention, the microcode defined logic within microcode ROM 304 prompts the control decode module 316 to store data in registers according to the size of the data that is to be stored as has been described for the functional block diagram of FIG. 4.

Figure 5:
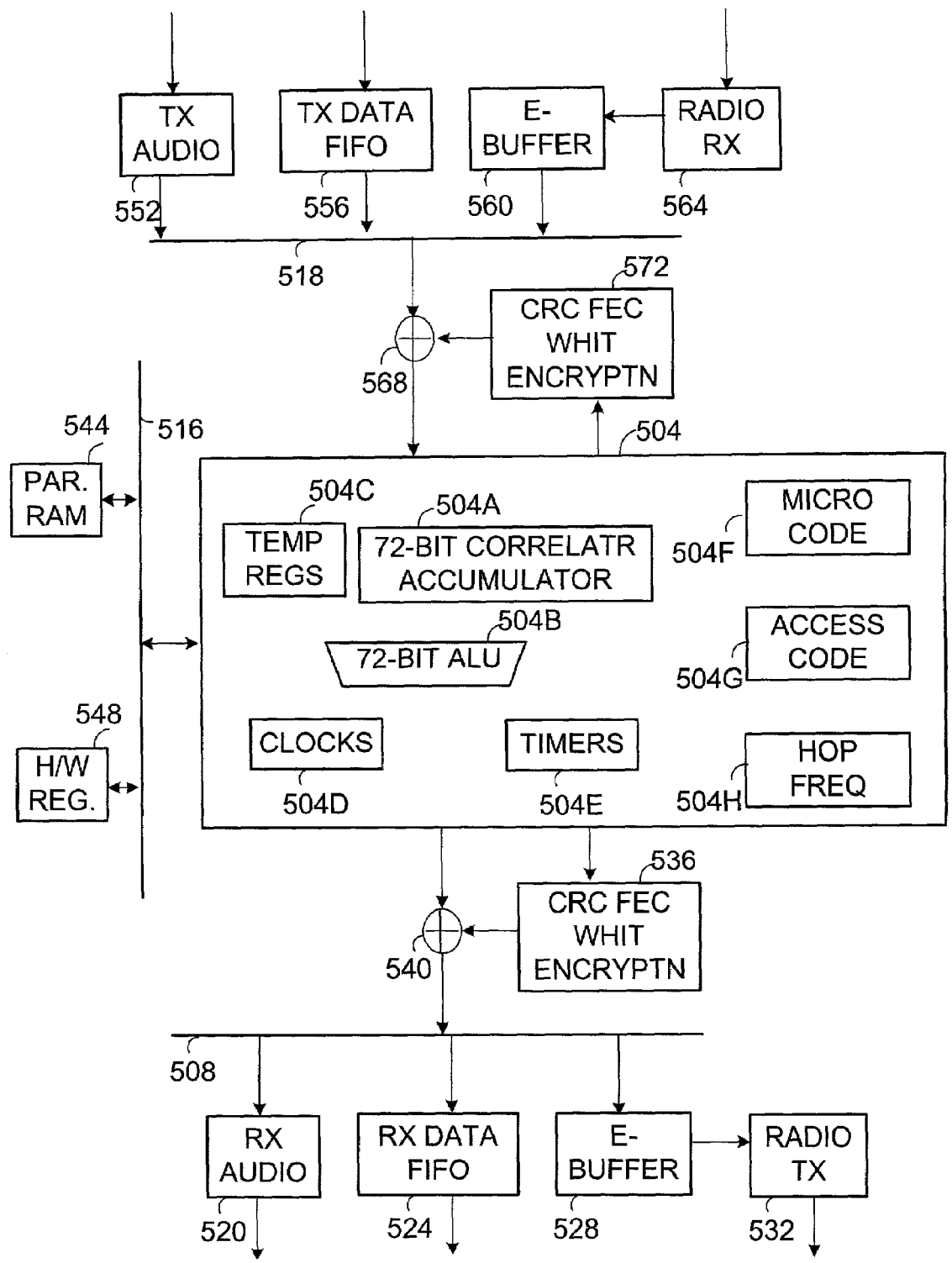
FIG. 5 is a functional schematic block diagram of a micro-sequencer configured as a real-time Bluetooth baseband controller.

FIG. 5 is a functional schematic block diagram of a microsequencer configured as a real-time Bluetooth baseband controller. A microsequencer circuit 500 in which the microsequencer is configured as a real-time Bluetooth baseband controller includes a microsequencer 504 that is coupled to a plurality of devices. More specifically, as may be seen, microsequencer 504 is coupled to a plurality of buses 508, 518 and 516 that enables it to communicate with registers, memory and other circuitry. For example, bus 508 is coupled to RX audio circuitry 520, RX data FIFO 524 and E-Buffer 528. E-Buffer 528 further is coupled to radio TX block 532. RX audio circuitry 520, RX data FIFO 524 are for receiving received audio processed by the microsequencer. E-Buffer 528 and radio TX 532 are for transmitting radio signals.

The microsequencer 504 of FIG. 5 includes a 72-bit correlator/accumulator 504A, a 72-bit arithmetic logic unit 504B and temporary registers 504C in the diagram shown herein. Microsequencer 504 further includes clock circuitry 504D and timer circuitry 504E for providing timing control functionality to facilitate satisfaction of Bluetooth requirements. The functionality of the clocks and timers are, in the described embodiment of the invention, similar to that which has been described elsewhere herein. Microsequencer 504 further includes microcode block 504F that is for storing microcode (operational computer instructions), access code block 504G that is for storing sync codes and hop frequency block 504H that is for storing frequency information.

Microsequencer 504 also is coupled to CRC FEC Whitten encryption modules 536 and 572 that are for providing CRC error detection, error correction and "whittening" of a given stream of digital signals. The outputs of modules 536 and 572 are coupled to logic gates (exclusive OR in the described embodiment) which combines their outputs with data being output from or input to microsequencer 504.

Parameter RAM block 544 and hardware registers block 548 are coupled to bus 516 to enable microsequencer 504 to transmit and receive data and commands therefrom. Parameter RAM block 544 is random access memory for providing temporary storage of data. Hardware registers block 548 comprises a plurality of accessible registers that are also used for storing data and/or computer instructions.

Similarly, TX audio block 552, TX data FIFO 556 and E-Buffer block 560 also are coupled to bus 518 to communicate with microsequencer 504. E-Buffer 560 further is coupled to receive radio transmissions from radio RX block 564. Bus 518 is coupled to produce communication signals to logic gate 568 that is also coupled to receive bits from CRC FEC Whiten encryption block 572.

In operation, a signal stream that is to be transmitted is received from external radio circuitry (not shown) at TX audio block 552 or TX data FIFO block 556. The signal is conducted along bus 518, through logic gate 568 to microsequencer 504. Microsequencer 504, in turn, processes the signal and outputs it to logic gate 540 where it is logically combined with the outputs of CRC FEC Whitten Encryption module 536. The output of the logic gate 540 is then produced to bus 508 which conducts the signal to E-Buffer 528 and radio TX block 532 for transmission.

Received transmission signals are processed in a similar manner. A received signal is conducted into radio RX block 564 for initial processing and then into E-Buffer 560. E-Buffer 560 produces the signal to logic gate 568 by way of bus 518 where it is logically combined with the output of CRC FEC Whitten Encryption module 572 that decodes the signal (among other functions). The received signal is then conducted through microsequencer 504 which then processes it and produces it to either RX audio block 520 or RX data FIFO block 524 for further audio processing.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. A microsequencer for use as a real-time Bluetooth baseband controller comprises:
  timer circuitry operably coupled to receive a requested timer counting value and to announce when the timer counting value has elapsed;
  temporary data storage circuitry operably coupled to store data, wherein the temporary data storage circuitry includes registers of different size;
  a data storage logic module, wherein the data storage logic module determines which available register should be used for storing data based upon the size of the data that is to be temporarily stored;
  a plurality of Bluetooth and native clocks operably coupled to support timing functionality of the timer circuitry according to Bluetooth specifications when in a master mode; and
  a plurality of externally-driven Bluetooth and native clocks operably coupled to support timing functionality of the timer circuitry according to Bluetooth specifications when in a slave mode.

2. The microsequencer of claim 1 wherein the temporary data storage circuitry includes a 64-bit storage register.

3. The microsequencer of claim 1 wherein the temporary data storage circuitry includes a 48-bit storage register.

4. The microsequencer of claim 1 wherein the temporary data storage circuitry includes a 32-bit storage register.

5. The microsequencer of claim 1 wherein the temporary data storage circuitry includes a 16-bit storage register.

6. The microsequencer of claim 1 wherein the temporary data storage circuitry includes a 64-bit register, a 48-bit register, a 32-bit register and a 16-bit register.

7. The microsequencer of claim 1 wherein the timer circuitry comprises at least four timers.

8. The microsequencer of claim 1 wherein the tinier circuitry comprises at least eight timers.

9. The microsequencer of claim 1 further comprises timer control logic circuitry for controlling the operation of the at least eight timers.

10. The microsequencer of claim 1 wherein the plurality of native and externally driven clocks include an externally driven Bluetooth clock.

11. The microsequencer of claim 1 wherein the plurality of native and externally driven clocks include a native Bluetooth clock.

12. The microsequencer of claim 1 wherein the plurality of native and externally driven clocks include an external real-time clock.

13. The microsequencer of claim 1 wherein the plurality of native and externally driven clocks include a native real-time clock.

14. A microsequencer for use as a real-time Bluetooth baseband controller, comprising:
   eight timers to provide traditional timer functionality;
   timer control logic circuitry;
   an externally driven Bluetooth clock;
   an externally driven real-time clock;
   a native Bluetooth clock;
   a native real-time clock;
   a 64-bit register for temporarily storing computational data;
   a 48-bit storage register for temporarily storing computational data;
   a 32-bit storage register for temporarily storing computational data;
   a 16-bit storage register for temporarily storing computational data; and
   data storage logic circuitry for determining which of the temporary storage registers is to store a piece of data that is to be temporarily stored.

15. The microsequencer of claim 14 wherein the period of one Bluetooth clock cycle is equal to 312.5 real-time clock cycle periods.

* * * * *